(12) United States Patent
Ikeda et al.

(10) Patent No.: US 6,392,784 B1
(45) Date of Patent: May 21, 2002

(54) FARADAY ROTATOR

(75) Inventors: Seiichi Ikeda; Nobuhiro Fukushima, both of Kawasaki; Hirohiko Sonada, Sapporo, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/577,339

(22) Filed: May 24, 2000

(30) Foreign Application Priority Data

Sep. 2, 1999 (JP) .......................................... 11-248847

(51) Int. Cl.⁷ .............................. G02F 1/09; G02B 27/28
(52) U.S. Cl. ...................... 359/282; 359/283; 359/324; 359/484
(58) Field of Search ................................ 359/280–283, 359/324, 258, 301, 345, 484, 494, 501; 252/582–585

(56) References Cited

U.S. PATENT DOCUMENTS

| | | | | |
|---|---|---|---|---|
| 3,617,942 A | * | 11/1971 | Kurtzig et al. | 359/283 |
| 4,974,944 A | * | 12/1990 | Chang | 359/499 |
| 5,087,984 A | * | 2/1992 | Heiney et al. | 359/282 |
| 5,535,046 A | * | 7/1996 | Shirai et al. | 252/584 |
| 5,640,516 A | * | 6/1997 | Iwatsuka et al. | 359/280 |
| 5,835,270 A | * | 11/1998 | Urino et al. | 359/281 |
| 6,288,827 B1 | * | 9/2001 | Kawai et al. | 359/283 |
| 6,333,806 B1 | * | 12/2001 | Onaka et al. | 359/246 |
| 6,339,492 B1 | * | 1/2002 | Terahara et al. | 359/280 |

FOREIGN PATENT DOCUMENTS

| | | |
|---|---|---|
| JP | 6-3622 | 1/1994 |
| JP | 2815509 | 8/1998 |
| JP | 11-249095 | 9/1999 |

* cited by examiner

*Primary Examiner*—Evelyn A Lester
(74) *Attorney, Agent, or Firm*—Staas & Halsey LLP

(57) ABSTRACT

An object of the invention is to provide a small size Faraday rotator which is easy to produce and enables reliable reduction of temperature dependence of the Faraday rotation angle, by defining the crystal orientation and arrangement order of each Faraday element when three or more Faraday elements are used. For this purpose, a Faraday rotator of the present invention comprises: a Faraday element section being composed of a plurality of Faraday elements, a permanent magnet for applying a magnetic field to each Faraday element in a parallel direction to an optical axis direction, and an electromagnet for applying a variable magnetic field in a perpendicular direction to the optical axis direction, wherein each Faraday element is arranged such that the crystal orientation of each is perpendicular to a light beam direction, and crystal orientations of adjacent Faraday elements are opposed to each other.

17 Claims, 9 Drawing Sheets

FARADAY ELEMENT
LIGHT BEAM
α
MAGNETIZATION $\theta_{Fmax}$
α
LIGHT BEAM DIRECTION
$\theta_F = \theta_{Fmax} \times \cos\alpha$

FARADAY ROTATOR

BACKGROUND OF THE INVENTION (1) Field of the Invention

The present invention relates to a Faraday rotator wherein an external magnetic field is applied such that the direction of magnetization of a Faraday element is tilted toward the light beam direction in order to reduce the temperature dependence of the Faraday rotation angle. Specifically, this invention relates to a Faraday rotator formed by a combination of three or more Faraday elements. This Faraday rotator is applicable, for example, to various kinds of optical devices that utilize the Faraday effect, such as optical attenuators and the like.

(2) Description of the Related Art

In optical communication systems, optical attenuators for controlling the amount of transmitted light, optical isolators for transmitting light only in one direction, and the like are necessary. Into these are built Faraday rotators for rotating the plane of polarization of the transmitted light. Additionally, Faraday rotators are used for various kinds of optical devices such as optical switches, optical circulators, optical filters, optical equalizers and the like.

For example, a variable optical attenuator is, in practice, sometimes necessary in a system with an optical amplifier. To be specific, in an erbium doped optical fiber amplifier or the like, a variable optical attenuator is used to maintain a constant output level within a range of required input levels. For this variable optical attenuator, the present applicant has proposed a variable optical attenuator wherein, with a configuration having no mechanical moving parts, the Faraday rotation angle is changed by changing the current applied to an electromagnet, and the attenuation is determined by the setting of this rotation angle (refer to the specification of Japanese Patent No. 2815509).

For Faraday elements to be built into Faraday rotators used for variable optical attenuators as mentioned above, Bi (bismuth)-substituted rare earth iron garnet single crystal film (LPE film) produced mainly by the LPE method (liquid phase epitaxial method) and the like have been used in recent years. That is because there is an advantage in that the LPE film has a larger Faraday rotation coefficient than YIG (yttrium iron garnet) single crystal due to the contribution of Bi.

However, this Bi-substituted rare earth iron garnet single crystal film has a deficiency in that there is a large temperature dependence of the Faraday rotation angle. Consequently, there has been a problem in that the temperature dependence of Faraday rotators also becomes large, and the temperature characteristics of devices such as variable optical attenuators and the like which are made up using such Faraday rotators is large.

Accordingly, the present applicants have proposed a technique wherein the temperature dependence of the Faraday rotation angle is reduced by applying an external magnetic field such that the variation of the Faraday rotation angle due to temperature dependence of the angle formed between the direction of magnetization and the light beam direction of a Faraday element, and the variation of the Faraday rotation angle due to temperature dependence of the Faraday effect are counterbalanced (refer to Japanese Unexamined Patent Publication No. 11-249095). Furthermore, this proposal also discloses a technique in that, when forming a Faraday rotator by combining a plurality of Faraday elements, by arranging each Faraday element according to a required standard and not in a random crystal orientation manner, the temperature dependence of the Faraday rotator is improved. To be specific, the details are that, for example, when three Faraday elements are used, by setting the crystal orientations of two Faraday elements in the same direction, and the crystal orientation of the remaining one Faraday element in a different direction, the temperature dependence of the Faraday rotation angle can be reduced.

However, with the proposed Faraday rotator mentioned above, only the crystal orientations of a plurality of Faraday elements are specified, and the order of each Faraday element, whose crystal orientation has been specified, is not specified. Therefore, if the magnetic field applied to each Faraday element becomes non-uniform state, there is a possibility that the temperature dependence of the Faraday rotation angle cannot be fully reduced. This is especially important when considering the construction of a Faraday rotator device. That is to say, since the electromagnet for controlling the Faraday rotation angle occupies the largest mounting space in the Faraday rotator, the size of the electromagnet needs to be minimized. However, since miniaturization of this electromagnet can easily cause non-uniformity in the magnetic field applied to each Faraday element, it is possible that the temperature dependence of the Faraday rotation angle cannot be fully reduced.

SUMMARY OF THE INVENTION

The present invention addresses the aforementioned points, with the object of providing a small size Faraday rotator which is easy to produce and enables reliable reduction of temperature dependence of the Faraday rotation angle, by defining the crystal orientation and the arrangement order of each Faraday element when a Faraday rotator is composed of three or more Faraday elements.

Here, for example, in a polarization independent optical isolator described in Japanese Unexamined Patent Publication No. 6-3622 and the like, a technique is disclosed in that a magnetic field is applied externally such that directions of magnetization of two optical path areas in a Faraday rotator are opposed to each other. However, since the object of the aforementioned invention is to realize an optical isolator which has high isolation and does not depend on a polarization, and the invention does not contain a technique such as for defining the crystal orientation of a Faraday element, it is different from the present invention.

To achieve the aforementioned object, according to the present invention, there is provided a Faraday rotator comprising three or more Faraday elements arranged along an optical axis direction, and a magnetic field applying device for applying an external magnetic field to each of the Faraday elements such that the direction of magnetization is tilted toward the optical axis direction, wherein each of the Faraday elements is arranged such that each crystal orientation is perpendicular to a light beam direction, and the crystal orientations of adjacent Faraday elements are opposed to each other.

With such a configuration, each Faraday element is magnetized by an external magnetic field applied by the magnetic field applying device, and a polarization plane of polarized light transmitted through each Faraday element is rotated. At this point, the external magnetic field is applied such that the direction of magnetization of each Faraday element is tilted toward the optical axis direction, whereby the temperature dependence of the Faraday rotation angle is reduced. Furthermore, by arranging each Faraday element such that the crystal orientations of adjacent Faraday elements are opposed to each other, then even though the component of the external magnetic field perpendicular to the optical axis direction becomes non-uniform state, an influence caused by this state is counterbalanced and reduced by a pair of adjacent Faraday elements. Hence the temperature dependence of the Faraday rotation angle can be reliably reduced. This also enables miniaturization of the Faraday rotator and an improvement in productivity.

Furthermore, with the aforementioned Faraday rotator, the magnetic field applying device may have a first magnetic field applying section for applying a magnetic field to each of the Faraday elements in a parallel direction to the optical axis direction, and a second magnetic field applying section for applying a magnetic field to each of the Faraday elements in a perpendicular direction to the optical axis direction. To be specific, the arrangement may be such that the first magnetic field applying section magnetically saturates each Faraday element using a fixed magnetic field from a permanent magnet, and the second magnetic field applying section controls the direction of magnetization of each Faraday element using a variable magnetic field from an electromagnet.

With this configuration, the arrangement is such that the direction of magnetization of each Faraday element is tilted toward the optical axis direction by a composite magnetic field of the first and the second magnetic field applying sections.

Furthermore, it is preferable that the magnetic field applying device of the aforementioned Faraday rotator applies an external magnetic field in a direction such that the magnitude of the total variation of a variation of the Faraday rotation angle due to temperature dependence of the angle between the direction of magnetization and the light beam direction of each Faraday element, and a variation of the Faraday rotation angle due to temperature dependence of the Faraday effect, is less than or equal in absolute terms to the magnitude of the total variation of the Faraday rotation angle due to temperature dependence of the Faraday effect of each Faraday element.

With such a configuration, the variation of the Faraday rotation angle due to temperature dependence of the angle between the direction of magnetization and the light beam direction of each Faraday element, and the variation of the Faraday rotation angle due to temperature dependence of the Faraday effect are counterbalanced, and temperature dependence of the Faraday rotation angle is reduced Moreover, as a specific example of each Faraday element, $(RBi)_3(FeM)_5O_{12}$ or $(RBi)_3Fe_5O_{12}$ (where R is one or more elements selected from rare earth elements including yttrium, and M is one or more elements that can be substituted for iron) produced by the liquid phase epitaxial method, or $Y_3Fe_5O_{12}$ may be used.

Furthermore, an optical attenuator may be constructed using the Faraday rotator mentioned above. To be specific, for example, this may use a Farad ay rotator with a configuration wherein an external magnetic field is applied using a permanent magnet and an electromagnet, and an amount of transmitted light is controlled by positioning a polarizer and an analyzer in front and behind the Faraday rotator in the light beam direction, and varying the external magnetic field by the electromagnet.

Other objects, features and advantages of this invention will become apparent from the following description of embodiments in association with the appended drawings.

BRIEF DESCRIPTION OF THE DRAWINGS

FIG. 7 is a graph showing the relationship between current value and Faraday rotation angle in a path a.

FIG. 11 is a sectional view showing the relationships between magnetic field, magnetic direction and crystal orientation in the path a.

DETAILED DESCRIPTION OF THE INVENTION

As follows is a description of the embodiments of the present invention based on the drawings.

Figure 1:
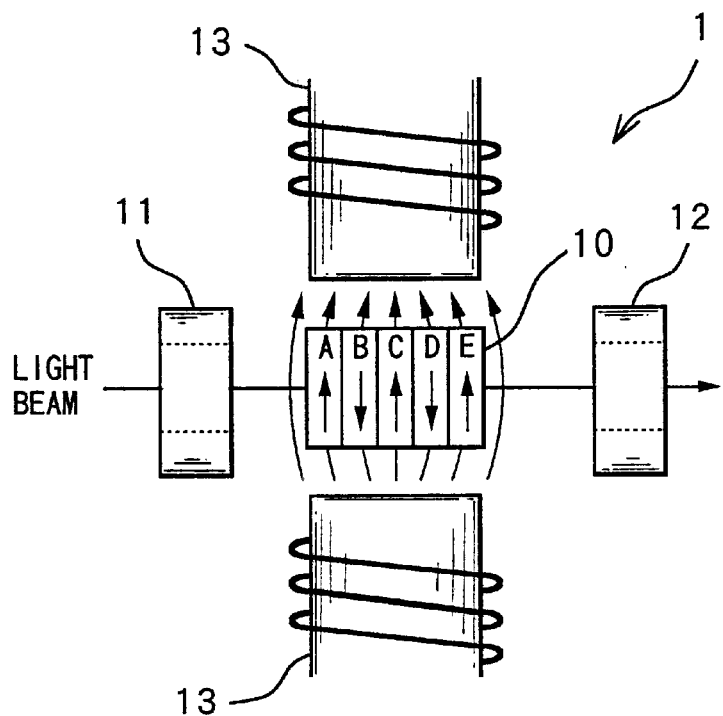
FIG. 1 is a plan view showing the structure of the principal parts of a Faraday rotator according to an embodiment of the present invention.
Figure 2:
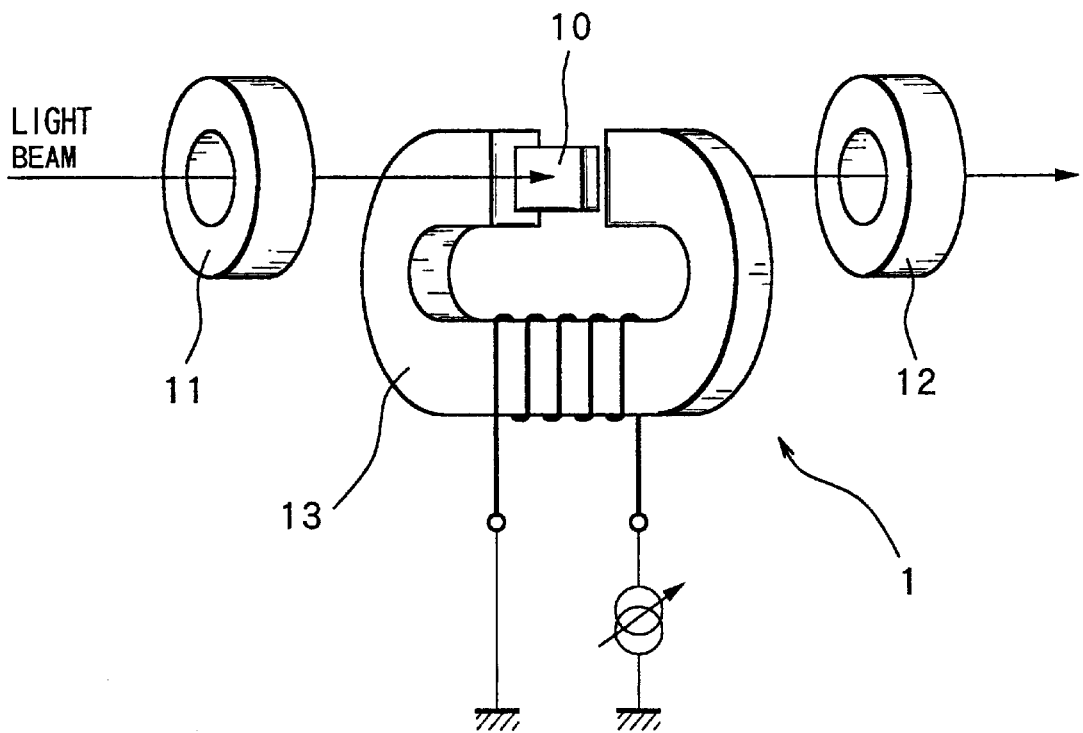
FIG. 2 is a perspective view showing the outward appearance of the Faraday rotator shown in FIG. 1.

FIG. 1 is a plan view showing the structure of the principal parts of a Faraday rotator according to an embodiment of the present invention. FIG. 2 is a perspective view showing the outward appearance of a Faraday rotator of the present embodiment.

In each figure, the present Faraday rotator 1 has a Faraday element section 10, permanent magnets 11 and 12, and an electromagnet 13. The Faraday element section 10 comprises three or more Faraday elements arranged along a light beam direction. FIG. 1 for example shows the case of using five Faraday elements A through E. Each Faraday element A through E is a magneto-optical crystal exhibiting the Faraday effect, being one magneto-optical effect, and is arranged such that the orientation of each crystal (orientation shown with arrows in each Faraday element A through E in FIG. 1) is perpendicular to the light beam direction, and adjacent crystal orientations are opposed: to each other (alternate directions). The magneto-optical crystal, being a Faraday element, may be for example, $(RBi)_3(FeM)_5O_{12}$ or $(RBi)_3Fe_5O_{12}$ (where R is one or more elements selected from rare earth elements including yttrium, and M is one or more elements that can be substituted for iron) produced by a liquid phase epitaxial method. Typically, the crystal is a composition of $Tb_{1.00}Y_{0.65}Bi_{1.35}Fe_{4.05}Ga_{0.95}O_{12}$. This may also be a garnet single crystal composed of $Y_3Fe_5O_{12}$.

The permanent magnets 11 and 12 apply a magnetic field to the Faraday element section 10 in a parallel direction to the optical axis direction. By the uniform magnetic field generated in these permanent magnets 11 and 12, the Faraday element section 10 becomes magnetically saturated. Here for example, the circular permanent magnets 11 and 12 are each arranged with appropriate polarity on the optical axis positioned in front and behind the Faraday element section 10. In FIG. 1 the magnetic field of the permanent magnets is not shown.

The electromagnet 13 applies a magnetic field to the Faraday element section 10 in a perpendicular direction to the light beam direction. The magnetic field generated by the electromagnet 13 is orthogonal to the magnetic field from the permanent magnets 11 and 12, and the strength thereof changes according to the current applied to the electromagnet 13. Accordingly, by changing the current applied to the electromagnet 13, the direction of the composite magnetic field of the fixed magnetic field from the permanent magnets 11 and 12, and the variable magnetic field from the electromagnet 13 is controlled, and the direction of magnetization of the Faraday element section 10 turns to the direction of this composite magnetic field so that the required Faraday rotation angle can be obtained.

A basic principle will be now explained whereby temperature dependence of the Faraday rotation angle is reduced with such a construction as described above. Here, this principle is the same as that proposed in the invention disclosed in the aforementioned Japanese Unexamined Patent Publication No. 11-249095.

Figure 3A:
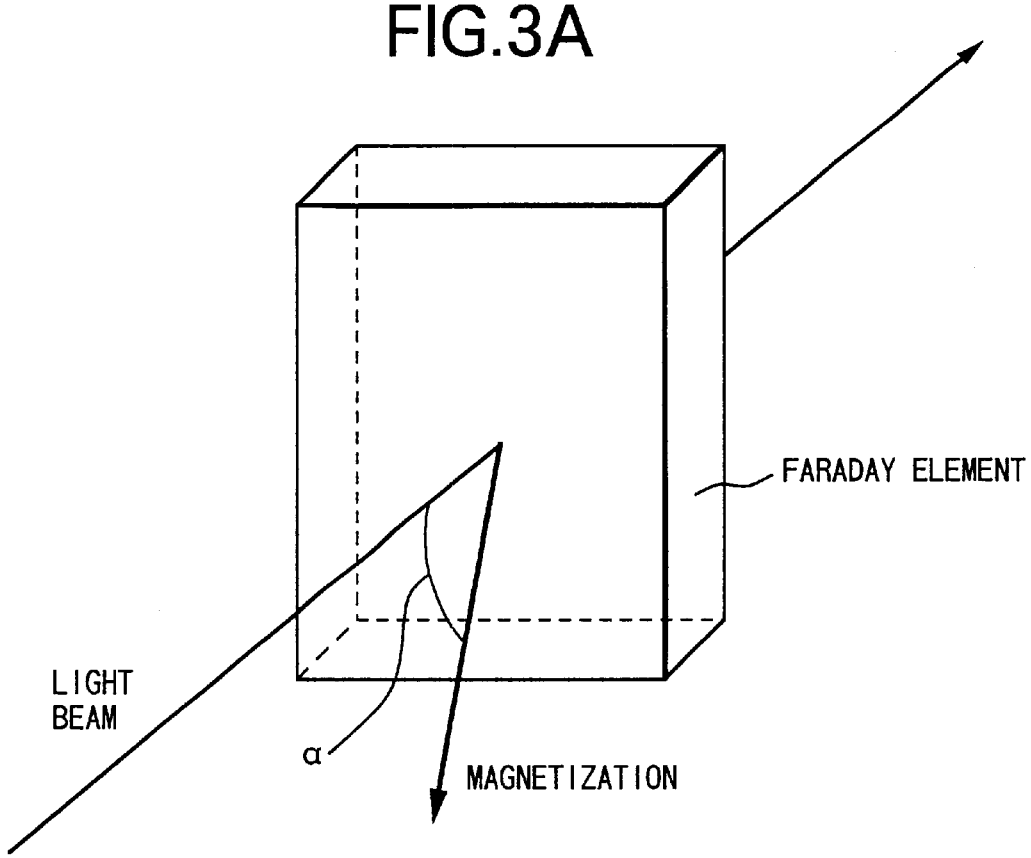
FIG. 3 is a diagram showing the relationship between a Faraday element and direction of magnetization.
Figure 3B:
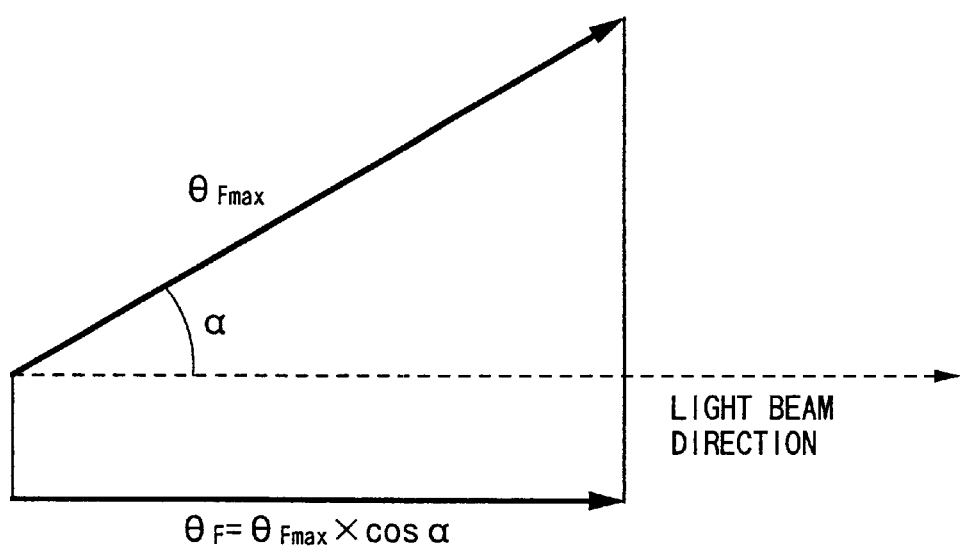

As shown in FIG. 3 (A), when light passes through the Faraday element, suppose the direction of magnetization of the Faraday element differs by an angle a from the light beam direction, the Faraday rotation angle $\theta_F$ can be represented by the following equation (1) as is shown in FIG. 3 (B).

$$\theta_F = \theta_{Fmax} \times \cos \alpha \quad (1)$$

Here $\theta_{Fmax}$ is the maximum value of the Faraday rotation angle, which is the case when the direction of magnetization coincides with the light beam direction. The plane of polarization rotates by only the component of magnetization in the light beam direction. Important here is that the direction of magnetization of the Faraday element is influenced by crystal magnet anisotropy of the magneto-optical crystal, in addition to the externally applied magnetic field. That is to say, not only $\theta_{Fmax}$ but also the angle $\alpha$ is a function of temperature T Therefore the aforementioned equation (1) can be represented by the following equation (2).

$$\theta_F(T) = \theta_{Fmax}(T) \times \cos \alpha(T) \quad (2)$$

According to the equation (2), the temperature coefficient of the Faraday rotation angle is represented by the following equation (3).

$$d\theta_F/dT = \cos \alpha \times d\theta_{Fmax}/dT + \theta_{Fmax} \times (-\sin \alpha) \times d\alpha/dT \quad (3)$$

Here, if constants $C_1 = \cos \alpha$, $C_2 = \theta_{Fmax} \times (-\sin \alpha)$, then the equation (3) can be represented as the following equation (4).

$$d\theta_F/dT = C_1 \times d\theta_{Fmax}/dT + C_2 \times d\alpha/dT \quad (4)$$

The first term on the right in the equation (4) is the temperature coefficient of the Faraday rotation angle due to temperature dependence of the Faraday effect of the Faraday element. On the other hand, the second term on the right corresponds to the rate of change of the Faraday rotation angle due to temperature dependence of the angle α between the direction of magnetization of the Faraday element and the light beam direction. Temperature variation of this angle α mainly originates from temperature dependence of crystal magnet anisotropy of the magneto-optical crystal, being the Faraday element.

In this connection, in the case of a Faraday rotator used in an optical isolator or the like, since an adequately large external magnetic field is applied along the light beam direction, and the direction of magnetization of the Faraday element always coincides with the light beam direction, the second term on the right of the above equation (4) is always zero, so that the only issue is the temperature coefficient of the material.

As mentioned above, since the first term on the right of the equation (4) is determined by the material, the numeric value cannot be altered by design. However, since the second term contains the angle a, the numeric value including signs can be made larger or smaller depending on the orientation of the crystal. That is to say, by turning the magnetization toward the specific orientation of the Faraday element, the signs of the first term and the second term on the right of the equation (4) can be reversed. Accordingly, the variation of the Faraday rotation angle is almost counterbalanced, and it is possible to reduce the temperature dependence of the Faraday rotation angle.

As follows is a detailed description of one specific example of the content mentioned above. Here, to simplify the description, a feature of a single Faraday element is examined. However, the same treatment is also possible in a case where a Faraday rotator is constructed with a plurality of Faraday elements.

Figure 4:
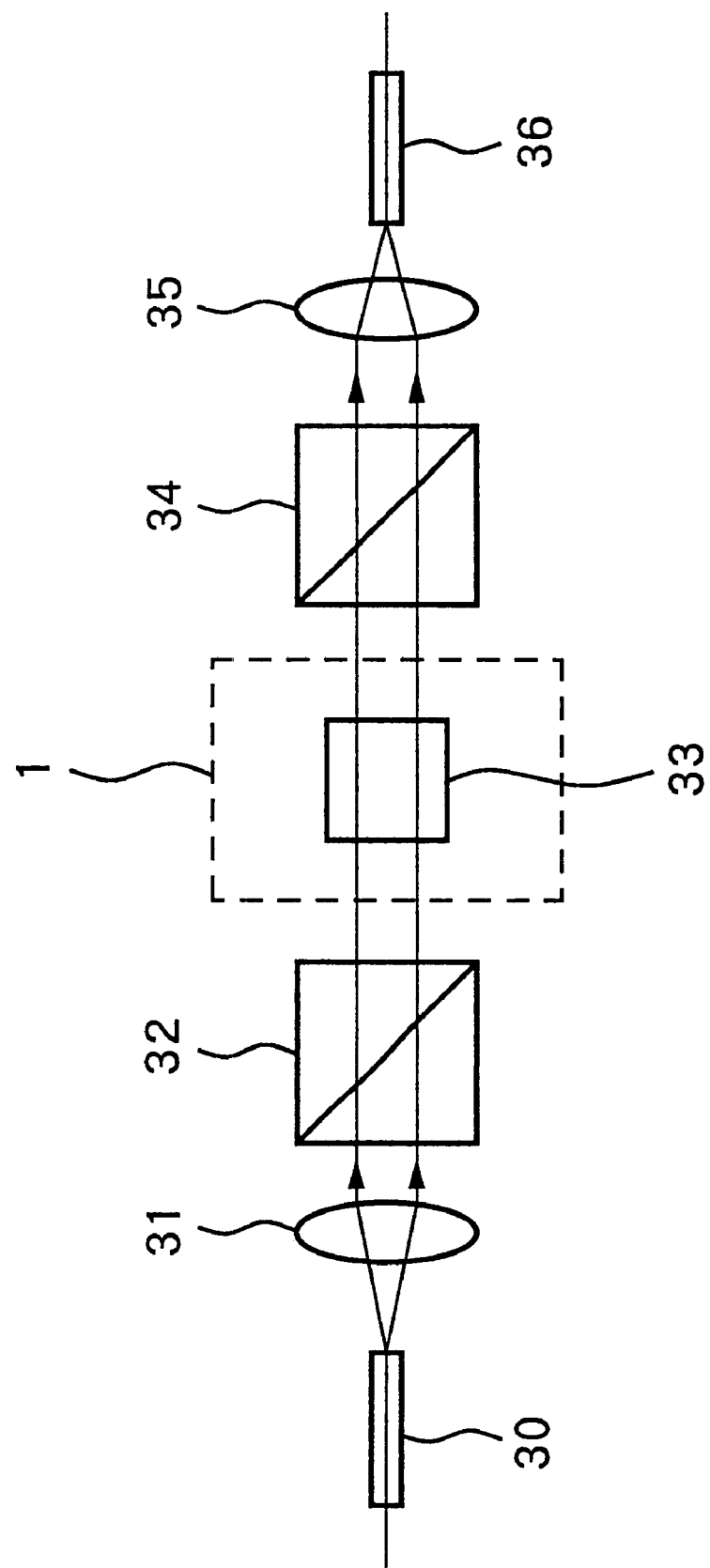
FIG. 4 is a diagram showing the structure of a measurement system (the same structure as an optical attenuator) for use when explaining the principle whereby the temperature dependence of the Faraday rotation angle is reduced.

Here, a measurement system shown in FIG. 4 was built, wherein the direction of the external magnetic field applied to a Faraday element, the electromagnet driving current value, and the temperature were arbitrarily changed, and the Faraday rotation angle was measured by a cross polarizer method. This is basically the same structure as an optical attenuator. In the measurement system in FIG. 4, light output from an optical fiber 30 is formed into parallel beams by a lens 31, passes through a polarizer 32, a Faraday element 33 and an analyzer 34, and is condensed into the entrance of an optical fiber 36 through a lens 35. The part in the dotted square in the figure corresponds to the Faraday rotator 1 shown in FIG. 2. A garnet single crystal was used for the Faraday element 33 used therein.

Figure 5:
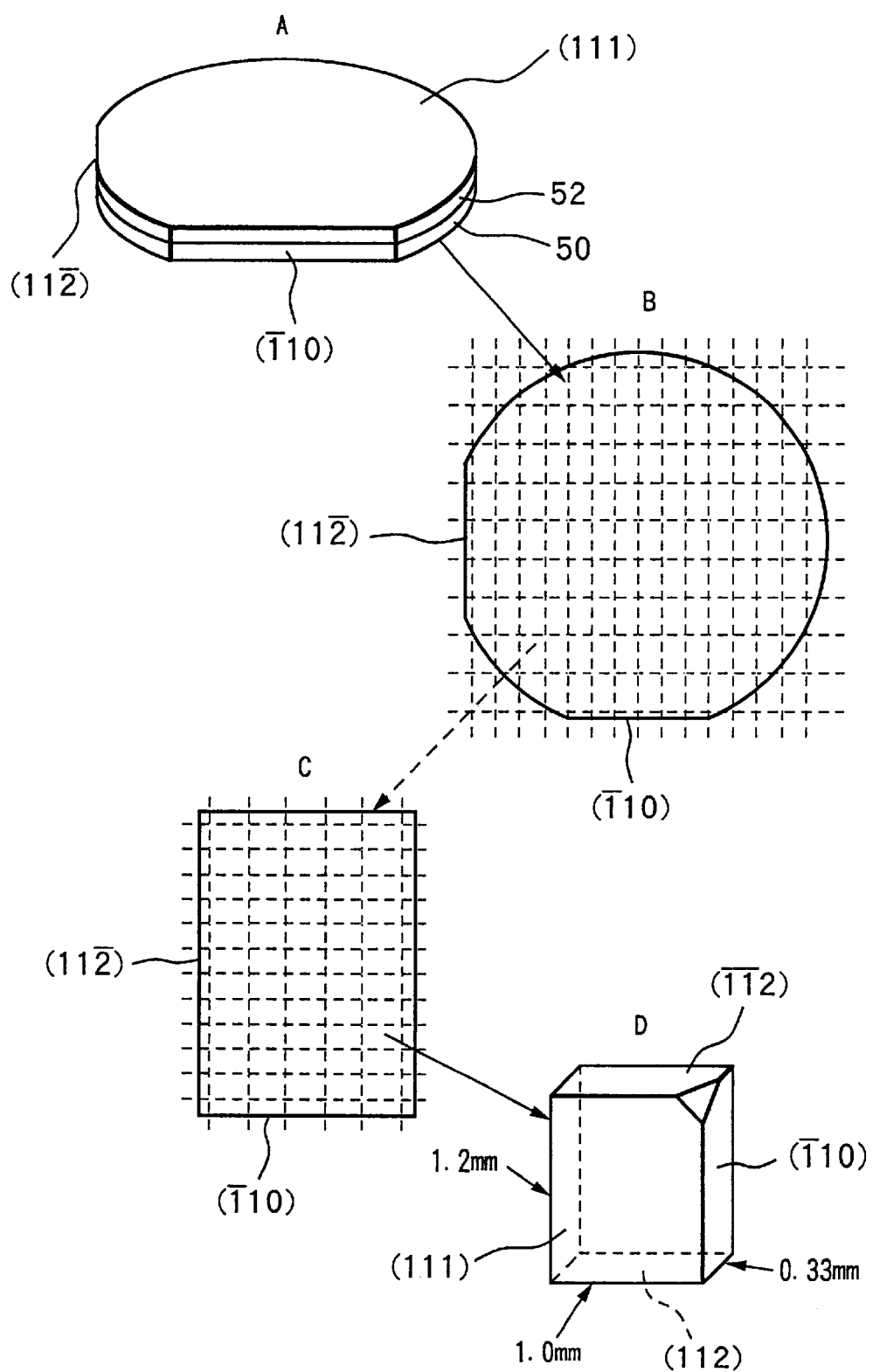
FIG. 5 is a diagram explaining the manufacturing process, shape of the final product and orientation, of a magnetic garnet single crystal.

Initially, the garnet single crystal, being the Faraday element 33, was produced as follows. With a flux of PbO—$B_2O_3$—$Bi_2O_3$, a bismuth-substituted rare earth iron garnet single crystal (LPE film, composition $Tb_{1.00}Y_{0.65}Bi_{1.35}Fe_{4.05}Ga_{0.95}O_{12}$, coating thickness 450 μm) was grown on the surface (111) of a substrate of 3 inches in diameter and 1170 μm in thickness having a lattice constant of 12.496 Å and a composition of $(CaGd)_3(MgZrGa)_5O_{12}$, by the liquid phase epitaxial method (LPE method). As shown in FIG. 5, two flat surfaces, large and small (orientation flats) were formed on a substrate 50 in advance; the large flat surface being a surface (−110), and the small flat surface being a surface (11-2). The LPE film is denoted by numeral 52. Next, the obtained LPE film was cut to 7.6 mm×5.0 mm, and after removing the substrate thereof by polishing, was heat treated for 8 hours at 1100° C. in the atmosphere. This was to reduce the uni-axial magnetic anisotropy constant by growth induction. Subsequently, the LPE film was polished again to a mirror finish to a shape of 7.6 mm×5.0 mm×0.33 mm, and a reflection reducing coating deposited on the surface (111) of both front and back surfaces. This was then cut to 100 mm×1.2 mm×0.33 mm, and finally the intersection point of the surface (111), the surface (–110) and the surface (–1–12) was ground a little to show the orientation. The final shape and surfaces of the garnet single crystal are shown in D in FIG. 5. When the magnetization required to saturate the garnet single crystal was measured by a Vibrating Sample Magnetometer (VSM), this was 120 oersted. Therefore, the fixed magnetic field of the permanent magnet was set at 150 oersted so as to saturate the garnet single crystal. Then, a measurement was performed in such a manner that light was incident vertically into the surface of the garnet single crystal where the reflection reducing coating was deposited, in other words the surface (111). The Faraday rotation angle was about 32 degrees when the magnetization of this garnet single crystal turned parallel to the light beam. Here, in the notation of surfaces and orientations of crystals, a negative characteristic is represented by a bar above the number. However, this is not possible in the present specification and is thus represented by a minus sign attached to the characteristic.

Figure 6:
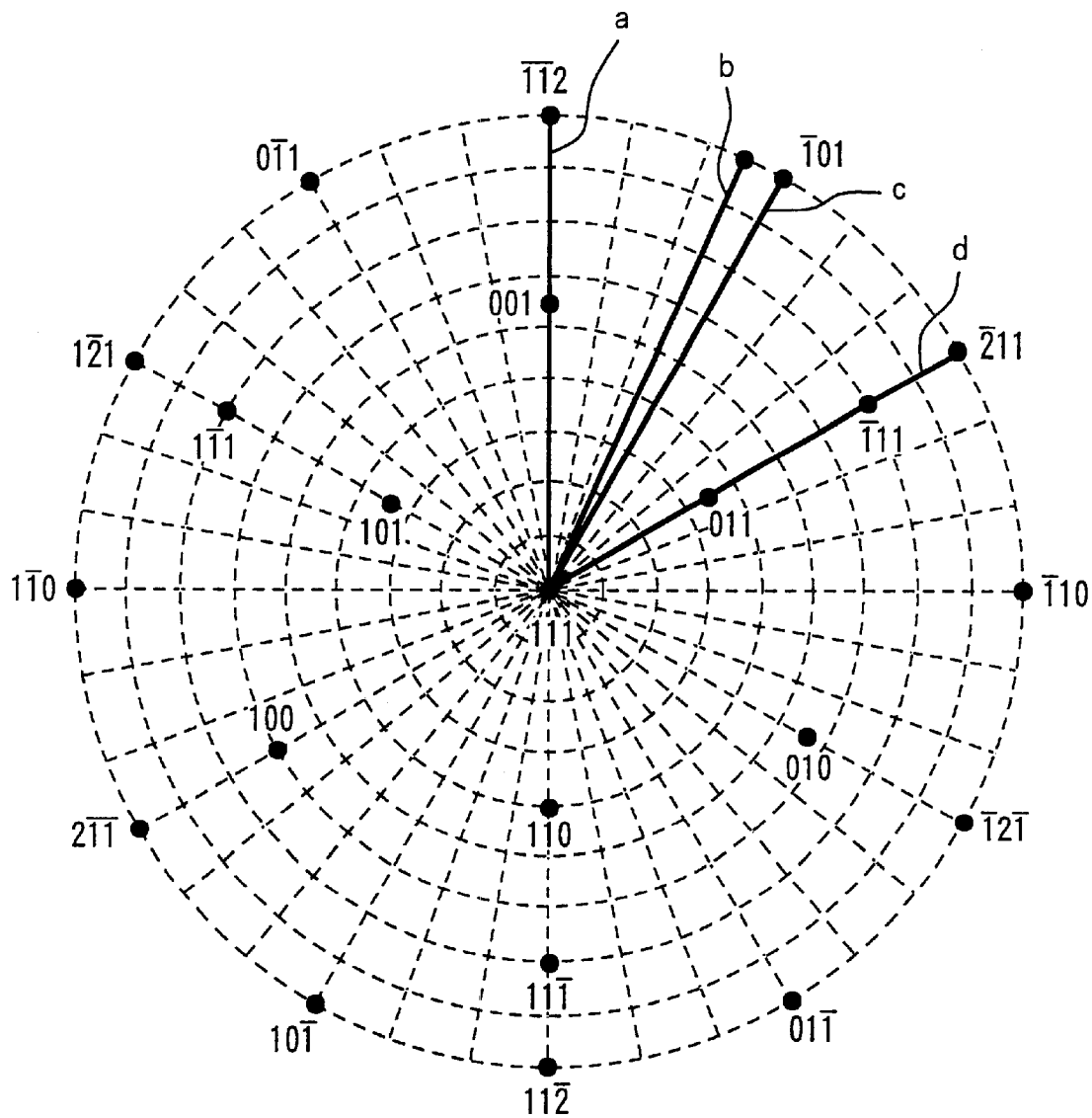
FIG. 6 is a stereo projection drawing having a surface (111) of the garnet single crystal at the center.

FIG. 6 is a stereo projection drawing having the surface (111) of the garnet single crystal at the center.

In FIG. 6, adjacent concentric circles represent surfaces with a 10 degree difference from each other, and adjacent diametric lines represent surfaces with a 10 degree difference from each other. Accordingly, any given surface of the garnet single crystal can be shown as a point in this stereo projection drawing.

A 150 oersted magnetic field was applied to the garnet single crystal by the permanent magnet in a perpendicular direction to the surface of the paper of FIG. 6, from the rear side to the front side thereof, thereby saturating the crystal. With this situation, the magnetic field was applied by an electromagnet in the a orientation: <–1–12>, the b orientation: a direction of 24 degrees to the <–101> from the <–1–12>, the c orientation: <–101> and the d orientation: <–211>, and each Faraday rotation angle was measured. Each measurement was performed at three temperatures: 10° C., 25° C. and 65° C.

The results of the measurement of the Faraday rotation angle are shown in FIG. 7 through FIG. 10. The comparison of FIG. 7 through FIG. 10 reveals that the spectra of the Faraday rotation angles differ greatly depending on the direction of the applied magnetic field. This is because the Faraday rotation angles observed contain contributions originating not only from the Faraday effect but also from crystal anisotropy. Garnet single crystals have crystal magnetic anisotropy, whereby the orientation <111> and its symmetric equivalent orientation are axes of easy are axes of hard magnetization. Crystal magnetic anisotropy is known to increase as temperature reduces.

Figure 7:
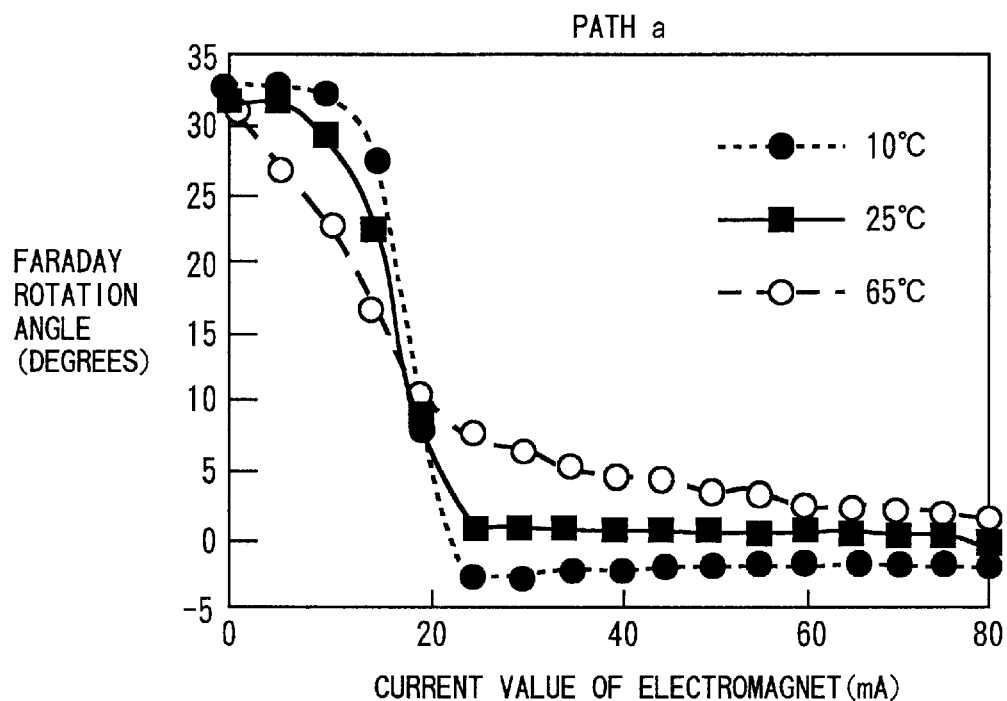
Figure 11:
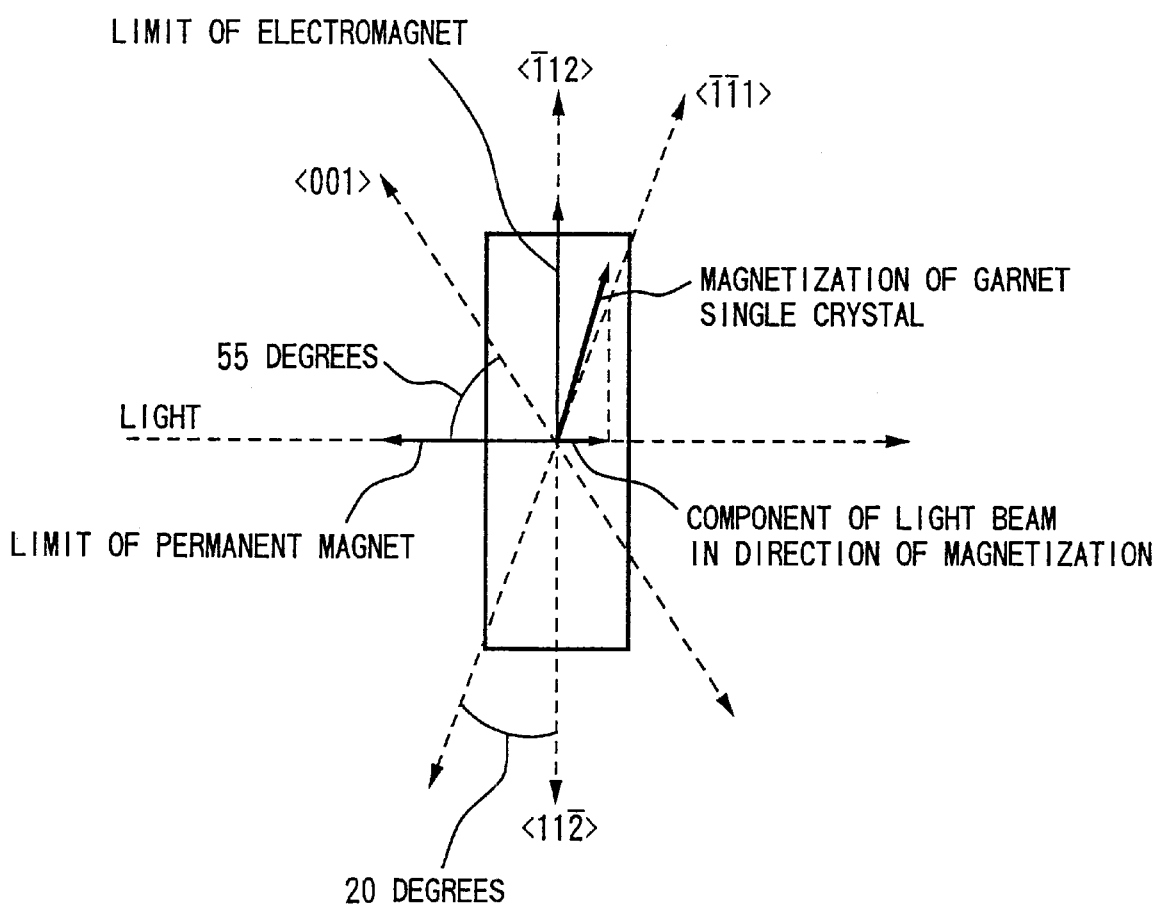

FIG. 7 is the case where the magnetic field of the electromagnet was applied to the orientation <–1–12>. That is to say, the path of the composite magnetic field vector of the electromagnet and the permanent magnet is a in FIG. 6, and the surface (001) is around the center of the path, to be exact, at 55 degrees from the surface (111). The sectional view of the path a is shown in FIG. 11. Magnetization of the garnet single crystal is easy to turn to the orientation <111> and the orientation <–1–11>, being axes of easy magnetization, and hard to turn to the orientation <001>, being a axis of hard magnetization. The degree of magnetization increases as temperature reduces. Therefore, as temperature reduces, the magnetization passes through the orientation <001> rapidly and approaches the orientation <–1–11>, and the spectrum of the Faraday rotation angle is as shown in FIG. 7. The reason why the Faraday rotation angle at 10° C. and 25° C. changes to negative from positive when the magnetic field of the electromagnet increases, is that the component of magnetization in the light beam direction is changed from reverse direction to forward direction with respect to the light beam propagation direction. In FIG. 7, at three values of current, 15 mA, 20 mA and 25 mA, there is a large difference in the temperature dependence of the Faraday rotation angle. At the value of 15 mA, the temperature coefficient of the Faraday rotation angle is negative, at 20 mA, almost zero, and at 25 mA, positive.

This phenomenon can be explained as follows. As mentioned before, the temperature coefficient of the Faraday rotation angle is determined by the equation (4). Since the contribution originating from the Faraday effect in the first term on the right in the equation (4) becomes smaller with an increase in temperature, the Faraday rotation angle decreases, and the temperature coefficient, in other words, the first term on the right, becomes negative. However, the contribution of the second term on the right, being the temperature coefficient of the Faraday rotation angle, originating from anisotropy, differs at each point, since the direction of the composite magnetic field vector of the electromagnet and the permanent magnet differ when current value differs (in other words, the direction of the applied magnetic field to the Faraday element changes). At the value of 15 mA, since the magnetization of the crystal cannot approach the orientation <001> as temperature reduces, the rotation angle a of magnetization becomes small. Conversely speaking, as temperature increases a increases and therefore the temperature coefficient of the second term becomes negative. Accordingly, in both the first term and the second term, the temperature coefficient is negative, and the temperature coefficient of the Faraday rotation angle to be observed, $d\theta_F/dTd$, also becomes negative. At the value of 25 mA, the magnetization of the crystal also cannot approach the orientation <001> as temperature reduces. However, since it has already passed through, the rotation angle a of magnetization increases. Conversely speaking, as temperature increases, a becomes smaller. Therefore, the temperature coefficient of the second term becomes positive, and since this is greater than that of the first term, the temperature coefficient of the Faraday rotation angle to be observed, $d\theta_F/dTd$, becomes positive. On the other hand, at the value of 20 mA, the second term is positive, and since it is almost the same as the first term, the temperature coefficient is counterbalanced to be almost zero.

Figure 8:
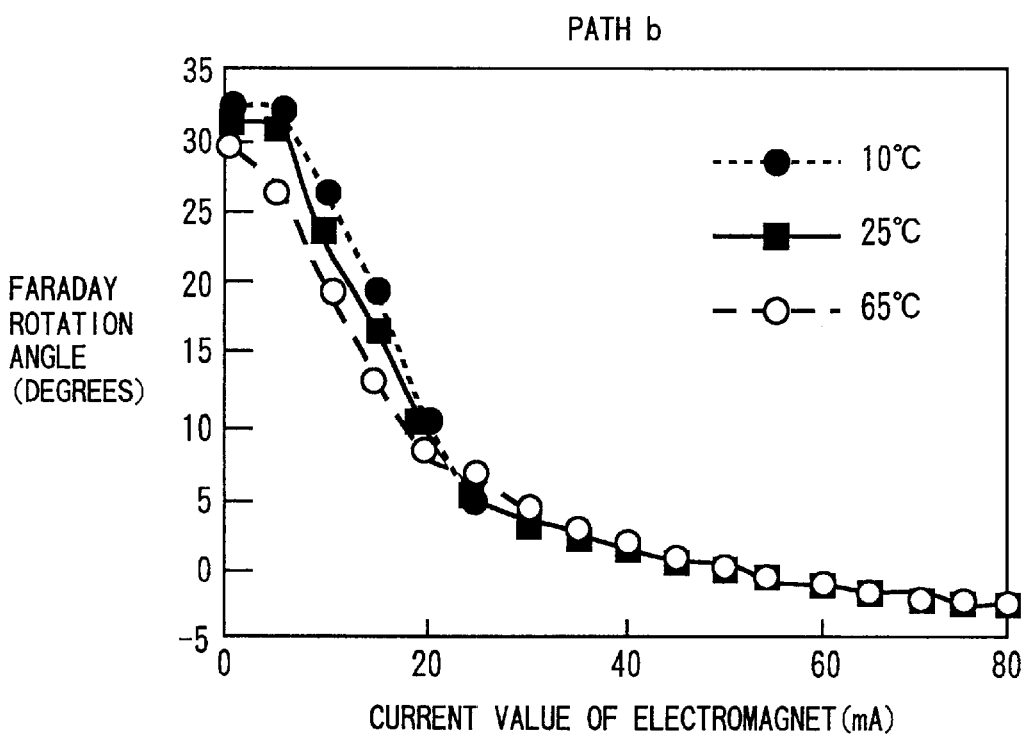
FIG. 8 is a graph showing the relationship between current value and Faraday rotation angle in a path b.

FIG. 8 is the case where the magnetic field of the electromagnet is applied in a direction of 24 degrees to the orientation <–101> from the orientation <–1–12>. That is to say, the path of the composite magnetic field vector of the electromagnet and the permanent magnet is b in FIG. 6. There is no axis of easy magnetization nor axis of hard magnetization on the path, however, there is an orientation <001> nearby. Under this influence, the first term and the second term on the right of the equation (4) are counterbalanced, and the Faraday rotation angle is almost the same value at 10° C., 25° C. and 65° C.

Figure 9:
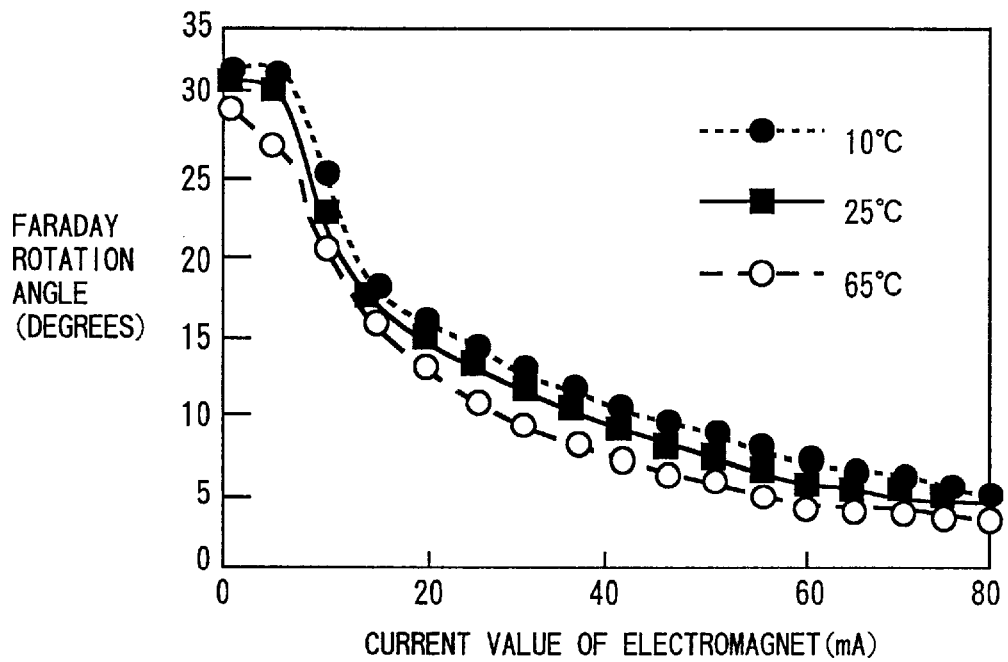
FIG. 9 is a graph showing the relationship between current value and Faraday rotation angle in a path c.

FIG. 9 is the case where the magnetic field of the electromagnet is applied in the orientation <–101>. That is to say, the path of the composite magnetic field vector of the electromagnet and the permanent magnet is c in FIG. 6, which is farthest away from the axes of easy magnetization and axes of hard magnetization, and the nearest axis of easy magnetization and axis of hard magnetization are positioned symmetrically from this path. For example, the nearest axes of easy magnetization, <–1–11> and <–111>, or axes of hard magnetization, <001> and <–100> are positioned where the path c becomes the axis of symmetry. Therefore, the direction of magnetization of the crystal is scarcely influenced by anisotropy, and follows the direction of the composite magnetic field vector of the electromagnet and the permanent magnet. The temperature coefficient, which has hardly any contribution from the second term, becomes negative from the contribution of the first term.

Figure 10:
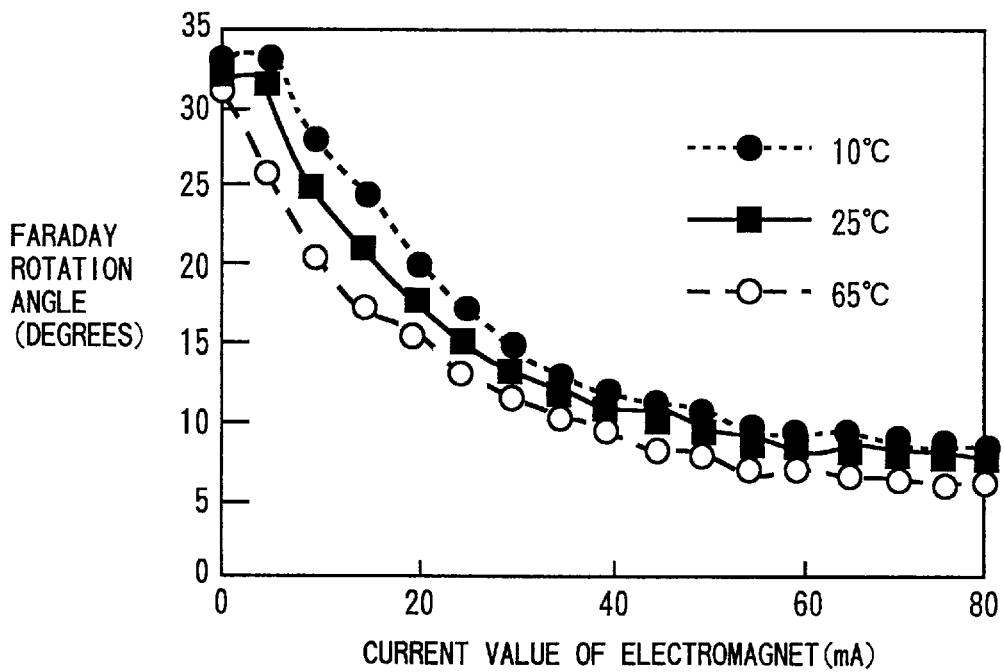
FIG. 10 is a graph showing the relationship between current value and Faraday rotation angle in a path d.

FIG. 10 is the case where the magnetic field of the electromagnet is applied in the orientation <−211>. That is to say, the path of the composite magnetic vector of the electromagnet and the permanent magnet is d in FIG. 6, and there is a surface (−111) at a location of 70 degrees from the center surface (111). Magnetization is easy to turn to the orientation <111> and the orientation <−111> as temperature reduces. The Faraday rotation angle in the case where crystal magnetization turns to the orientation <−111> is (the Faraday rotation angle when magnetization turns to the light beam direction)×cos70=32 degrees×cos70=11 degrees. The reason why the Faraday rotation angle is larger on the side of greater current value of the spectrum in FIG. 10 than that of the spectrum in FIG. 9 is that magnetization of the crystal turns to the vicinity of the orientation <−111>.

By applying a magnetic field in a specific direction of the garnet single crystal in this manner, the signs of the first term and the second term can be reversed, whereby the variation of the Faraday rotation angle is counterbalanced so that temperature dependence of the Faraday rotation angle can be reduced. Furthermore, as one means, the magnetic field may be applied in a single specific direction as in FIG. 7 and FIG. 8. Moreover, since the spectra in FIG. 7 through FIG. 10 differ greatly, the arrangement may also be such that, by using a plurality of garnet single crystals for the Faraday element, a magnetic field is applied in an optional orientation of each crystal so that the temperature dependence of the Faraday rotation angle of their combined total is reduced.

Here, because of the symmetry property of crystal, in FIG. 6, in a case where a magnetic field is applied in the orientation <−1−12> being the path a, and in a case where a magnetic field is applied in the symmetry equivalent orientation, that is, in the orientation <−12−1> and the orientation <2−1−1> which are located at 120 degrees from the orientation <−1−12>, the behavior of the Faraday rotation angle is the same. Similarly, in the paths b through d, with symmetric equivalent orientation, the result is also the same.

Based on the principle as mentioned above, with the Faraday rotator 1 of the present embodiment, temperature dependence of the Faraday rotation angle is reduced. This is the same content as that previously proposed Japanese Unexamined Patent Publication No. 11-249095. As follows is a specific description of the characteristics of the present invention.

With the Faraday rotator 1 with a construction as shown in FIG. 1 and FIG. 2 mentioned above, for a required purpose (for example, reduction of temperature dependence or the like), if a case is supposed wherein it is necessary to arrange the crystal orientation of each of a plurality of Faraday elements A through E in a proportion of 3 to 2 or the like, the method of the arrangement is such that the orientation of each of the Faraday elements A, C, and E is upward, and the orientation of each of the Faraday elements B and D is downward, as shown in FIG 1.

Figure 12A:
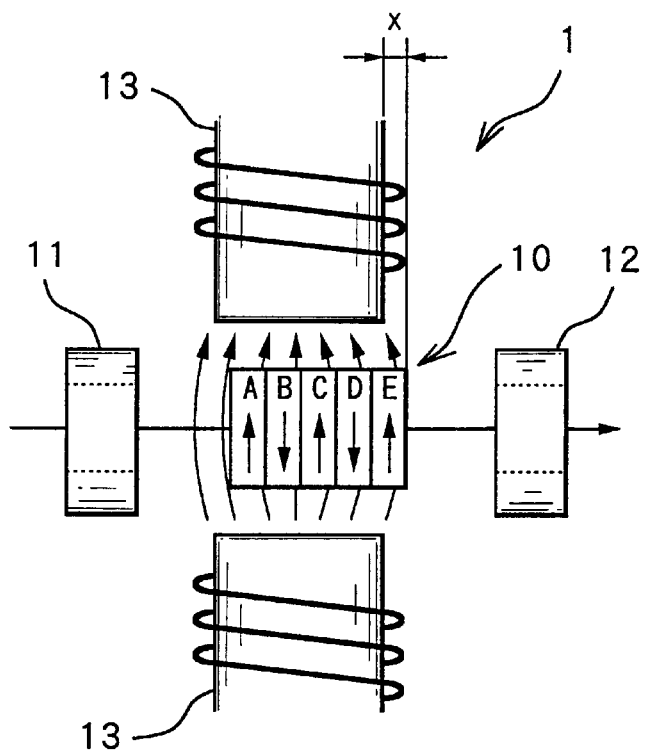
FIG. 12 is a diagram showing a situation where an error occurs in the positional relationship between an electromagnet and a Faraday element section, (A) showing the case where the arrangement order of the Faraday elements is considered, and (B) showing the case where the arrangement order of the Faraday elements is not considered.
Figure 12B:
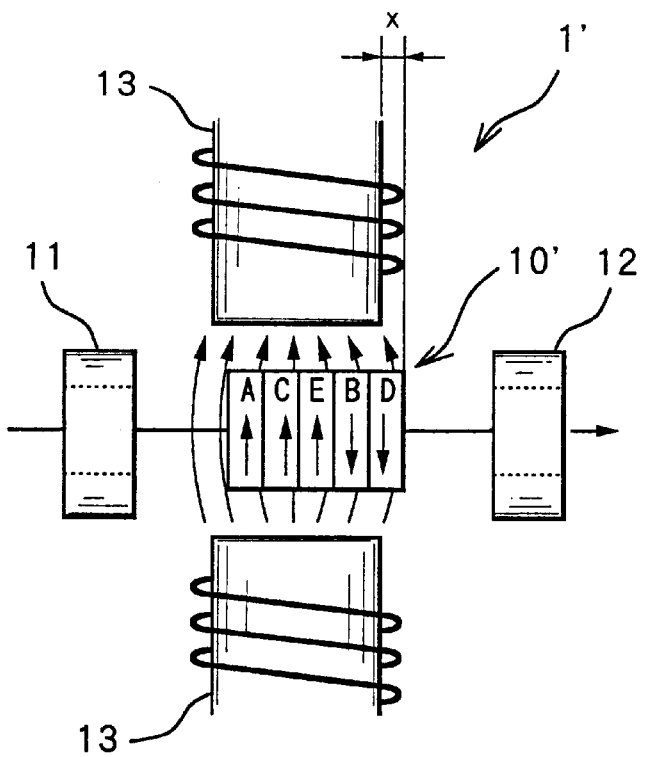

With this, since the crystal orientations of adjacent Faraday elements are in opposite directions, for example, even though an error x occurs in the positional relationship between the electromagnet 13 and the Faraday element section 10, as shown in FIG. 12 (A), the influence of the non-uniformity of magnetic field by the error x on the characteristics of the whole Faraday rotator 1 becomes comparatively small. That is to say, in the case of FIG. 12(A), the non-uniformity of the magnetic field by the electromagnet 13 occurs in a pair of the Faraday elements E and D whose crystal orientations are upward and downward, respectively. However, since the crystal orientations of the Faraday element D and E are opposite, the influence is counterbalanced. This enables a greater production error tolerance of the Faraday rotator 1.

On the other hand, as shown in FIG. 12 (B), in the case where, without considering the arrangement order of each Faraday element, for example, the Faraday elements A, C, and E having upward orientations, and the Faraday elements B and D having downward orientations are arranged in the order of A, C, E, B and D, when an error x occurs in the positional relationship between the electromagnet 13 and the Faraday element section 10, it is difficult to apply a sufficient magnetic field to the Faraday elements B and D whose orientations are both downward. Therefore, the influence of the error x on the characteristics of the whole Faraday rotator 1' becomes great, which makes it difficult to obtain the desired characteristics. That is to say, with such an arrangement, it is necessary to narrow the production error tolerance of the Faraday rotator 1'.

As is seen above, with the Faraday rotator 1 of the present embodiment, since the crystal orientation and the arrangement order of each Faraday element A through E are defined, even though the variable magnetic field of the electromagnet 13 is non-uniform, it is possible to reduce the influence. This enables the use of a small size electromagnet, and it is possible to miniaturize the Faraday rotator 1. Furthermore, since the production tolerance of the Faraday rotator 1 can be increased, it is possible to provide a Faraday rotator with low cost and high productivity. A Faraday rotator of this kind is applicable to various kinds of optical devices, such as optical attenuators, optical isolators, optical switches, optical circulators, optical filters, optical equalizers and the like.

Here, in the embodiment mentioned above, the case is shown for where the Faraday element 10 is formed by combining five pieces of Faraday elements. However, the present invention is not limited to this embodiment. In the case where three or more Faraday elements are used, it is possible to obtain the same effect as in the above-mentioned embodiment, by alternately arranging the crystal orientation of each Faraday element.

What we claimed are:

1. A Faraday rotator comprising:
   three or more Faraday elements arranged along an optical axis direction; and
   magnetic field applying means for applying an external magnetic field to each of said Faraday elements such that a direction of magnetization is tilted toward the optical axis direction, wherein,
   each of said Faraday elements is arranged such that each crystal orientation of said Faraday elements is perpendicular to a light beam direction, the crystal orientations of adjacent Faraday elements are opposed to each other, an angle between the crystal orientations of the adjacent Faraday elements being approximately 180°.

2. A Faraday rotator according to claim 1, wherein said magnetic field applying means has a first magnetic field applying section for applying a magnetic field to each of said Faraday elements in a parallel direction to the optical axis direction, and a second magnetic field applying section for applying a magnetic field to each of said Faraday elements in a perpendicular direction to the optical axis direction, the arrangement being such that the direction of magnetization of each Faraday element is tilted toward the optical axis direction by a composite magnetic field of said first and said second magnetic field applying sections.

3. A Faraday rotator according to claim 2, wherein said first magnetic field applying section has a permanent magnet, and magnetically saturates each Faraday element using a fixed magnetic field from said permanent magnet, and said second magnetic field applying section has an electromagnet, and controls the direction of magnetization of each Faraday element using a variable magnetic field from said electromagnet.

4. A Faraday rotator according to claim 1, wherein said magnetic field applying means applies an external magnetic field in a direction such that a magnitude of a total variation of a variation of a Faraday rotation angle due to temperature dependence of an angle between the direction of magnetization and the light beam direction of each Faraday element, and a variation of a Faraday rotation angle due to temperature dependence of a Faraday effect, is less than or equal in absolute terms to a magnitude of a total variation of a Faraday rotation angle due to temperature dependence of a Faraday effect of each Faraday element.

5. A Faraday rotator according to claim 1, wherein each of said Faraday elements is $(RBi)_3(FeM)_5O_{12}$ or $(RBi)_3Fe_5O_{12}$, where R is one or more elements selected from rare earth elements, and M is one or more elements that can be substituted for iron, produced by a liquid phase epitaxial method.

6. A Faraday rotator according to claim 1, wherein each of said Faraday elements is $Y_3Fe_5O_{12}$.

7. An optical attenuator which uses a Faraday rotator as disclosed in claim 1.

8. An optical attenuator which uses a Faraday rotator as disclosed in claim 3, and wherein an amount of transmitted light is controlled by positioning a polarizer and an analyzer in front and behind said Faraday rotator in a light beam direction, and varying an external magnetic field by said electromagnet.

9. A Faraday rotator comprising:
   three or more Faraday elements arranged along an optical axis direction; and
   a magnetic field applying device applying an external magnetic field to each of said Faraday elements such that a direction of magnetization is tilted toward the optical axis direction, wherein,
      each of said Faraday elements is arranged such that each crystal orientation of said Faraday elements is perpendicular to a light beam direction, the crystal orientations of adjacent Faraday elements are opposed to each other, an angle between the crystal orientations of the adjacent Faraday elements being approximately 180°.

10. A Faraday rotator according to claim 9, wherein said magnetic field applying device has a first magnetic field applying section applying a magnetic field to each of said Faraday elements in a parallel direction to the optical axis direction, and a second magnetic field applying section applying a magnetic field to each of said Faraday elements in a perpendicular direction to the optical axis direction, the arrangement being such that the direction of magnetization of each Faraday element is tilted toward the optical axis direction by a composite magnetic field of said first and said second magnetic field applying sections.

11. A Faraday rotator according to claim 10, wherein said first magnetic field applying section has a permanent magnet, and magnetically saturates each Faraday element using a fixed magnetic field from said permanent magnet, and said second magnetic field applying section has an electromagnet, and controls the direction of magnetization of each Faraday element using a variable magnetic field from said electromagnet.

12. A Faraday rotator according to claim 9, wherein said magnetic field applying device applies an external magnetic field in a direction such that a magnitude of a total variation of a variation of a Faraday rotation angle due to temperature dependence of an angle between the direction of magnetization and the light beam direction of each Faraday element, and a variation of a Faraday rotation angle due to temperature dependence of a Faraday effect, is less than or equal in absolute terms to a magnitude of a total variation of a Faraday rotation angle due to temperature dependence of a Faraday effect of each Faraday element.

13. A Faraday rotator according to claim 9, wherein each of said Faraday elements is $(RBi)_3(FeM)_5O_{12}$ or $(RBi)_3Fe_5O_{12}$, where R is one or more elements selected from rare earth elements, and M is one or more elements that can be substituted for iron, produced by a liquid phase epitaxial method.

14. A Faraday rotator according to claim 9, wherein each of said Faraday elements is $Y_3Fe_5O_{12}$.

15. An apparatus comprising:
   a Faraday rotator having three or more Faraday elements arranged along an optical axis direction; and
   a magnetic field applying device applying an external magnetic field to each of said Faraday elements such that a direction of magnetization is tilted toward the optical axis direction, wherein,
      each of said Faraday elements is arranged such that each crystal orientation of said Faraday elements is perpendicular to a light beam direction, the crystal orientations of adjacent Faraday elements are opposed to each other, an angle between the crystal orientations of the adjacent Faraday elements being approximately 180°.

16. An apparatus according to claim 15, wherein said apparatus is an optical attenuator.

17. An apparatus according to claim 15, wherein said apparatus further comprises:
   a polarizer and an analyzer positioned in front and behind said Faraday rotator, respectively, so that an amount of transmitted light is controlled in a light beam direction.

* * * * *

UNITED STATES PATENT AND TRADEMARK OFFICE
CERTIFICATE OF CORRECTION

PATENT NO.   : 6,392,784 B1                                     Page 1 of 1
DATED        : May 21, 2002
INVENTOR(S)  : Seiichi Ikeda et al.

It is certified that error appears in the above-identified patent and that said Letters Patent is hereby corrected as shown below:

<u>Title page,</u>
Item [75], please delete "Sonada" and insert -- Sonoda --.

Signed and Sealed this

Twenty-seventh Day of August, 2002

*Attest:*

*Attesting Officer*

JAMES E. ROGAN
*Director of the United States Patent and Trademark Office*